US012300251B2

(12) United States Patent
Park et al.

(10) Patent No.: US 12,300,251 B2
(45) Date of Patent: May 13, 2025

(54) END-TO-END SPEAKER DIARIZATION SYSTEM WITH AUXILIARY LOSS AND METHOD THEREOF

(71) Applicant: Gwangju Institute of Science and Technology, Gwangju (KR)

(72) Inventors: Dong Keon Park, Gwangju (KR); Hong Kook Kim, Gwangju (KR); Ye Chan Yu, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 311 days.

(21) Appl. No.: 18/070,499

(22) Filed: Nov. 29, 2022

(65) Prior Publication Data

US 2023/0352041 A1 Nov. 2, 2023

(30) Foreign Application Priority Data

Apr. 29, 2022 (KR) .......................... 10-2022-0053301

(51) Int. Cl.
| | |
|---|---|
| *G10L 17/18* | (2013.01) |
| *G10L 21/0272* | (2013.01) |
| *G10L 21/0308* | (2013.01) |
| *G10L 25/18* | (2013.01) |

(52) U.S. Cl.
CPC .......... *G10L 17/18* (2013.01); *G10L 21/0272* (2013.01); *G10L 21/0308* (2013.01); *G10L 25/18* (2013.01)

(58) Field of Classification Search
None
See application file for complete search history.

(56) References Cited

U.S. PATENT DOCUMENTS

| | | | | |
|---|---|---|---|---|
| 2020/0043508 | A1* | 2/2020 | Song | G10L 25/30 |
| 2022/0254352 | A1* | 8/2022 | Fujita | G10L 17/18 |
| 2023/0169981 | A1* | 6/2023 | Kim | G10L 17/02 |
| | | | | 704/232 |
| 2024/0038255 | A1* | 2/2024 | Ando | G10L 17/18 |
| 2024/0105182 | A1* | 3/2024 | Ando | G10L 15/04 |

FOREIGN PATENT DOCUMENTS

KR  10-2190989 B1  12/2020

OTHER PUBLICATIONS

Pham, Ngoc-Quan, et al. "Very deep self-attention networks for end-to-end speech recognition." arXiv preprint arXiv:1904.13377 (2019). (Year: 2019).*
Al-Rfou, Rami, et al. "Character-level language modeling with deeper self-attention." Proceedings of the AAAI conference on artificial intelligence. vol. 33. No. 01. 2019. (Year: 2019).*
Fujita, Yusuke, et al. "End-to-end neural speaker diarization with self-attention." 2019 IEEE Automatic Speech Recognition and Understanding Workshop (ASRU). IEEE, 2019. (Year: 2019).*

* cited by examiner

*Primary Examiner* — Douglas Godbold
(74) *Attorney, Agent, or Firm* — Revolution IP, PLLC (57) ABSTRACT

The present invention relates to a speaker diarization technology, and more specifically to, end-to-end speaker diarization system and method through transformer learning having an auxiliary loss-based residual connection to separate speakers by dividing the speakers for time interval, wherein the end-to-end speaker diarization system and method using an auxiliary loss can differentiate and separate speakers through speaker labeling based on the transformer learning using an auxiliary loss even if speaker speeches overlap in a multi-speaker environment.

2 Claims, 6 Drawing Sheets

| Method | Sim2spk | | | Real | 비고 |
|---|---|---|---|---|---|
| | ρ = 34.4% | ρ = 27.3% | ρ = 19.6% | CH | |
| SA-EEND-baseline | 5.97 | 5.65 | 5.33 | 10.72 | Encoder Layer: 4 |
| RX-EEND-baseline | 4.18 | 3.93 | 4.01 | 9.17 | Encoder Head: 4<br>Encoder Dim: 256 |
| SA-EEND-deep | 10.33 | 10.30 | 9.56 | 12.62 | Encoder Layer: 8 |
| RX-EEND-deep | 3.13 | 2.84 | 2.63 | 7.69 | Encoder Head: 4<br>Encoder Dim: 256 |
| SA-EEND-large | 5.61 | 5.45 | 4.58 | 10.15 | Encoder Layer: 8 |
| RX-EEND-large | 2.74 | 2.45 | 2.72 | 7.37 | Encoder Head: 8<br>Encoder Dim: 512 |

FIG. 10

| Block number | 1 | 2 | 3 | 4 | 5 | 6 | 7 | 8 |
|---|---|---|---|---|---|---|---|---|
| SA-EEND-large | 82.25 | 79.04 | 64.70 | 71.75 | 60.02 | 40.86 | 45.00 | 5.61 |
| RX-EEND-large | 27.27 | 13.46 | 7.28 | 4.95 | 4.06 | 3.16 | 2.89 | 2.74 |

FIG. 11

| Residual | $L_{aux}^{shared}$ | $L_{aux}^{indiv}$ | Sim2spk | Real |
|---|---|---|---|---|
| | | | 5.61 | 10.15 |
| ✓ | | | 5.58 | 10.00 |
| | ✓ | | 5.58 | 9.91 |
| | | ✓ | 2.79 | 8.02 |
| ✓ | | ✓ | 2.74 | 7.37 |

END-TO-END SPEAKER DIARIZATION SYSTEM WITH AUXILIARY LOSS AND METHOD THEREOF

BACKGROUND OF THE INVENTION

Field of the Invention

The present invention relates to a speaker diarization technology, and more specifically to, end-to-end speaker diarization system and method through transformer learning having an auxiliary loss-based residual connection to separate speakers by dividing the speakers for time interval.

BACKGROUND ART

A speaker diarization (SD) is a process of segmenting an audio recording into homogeneous segments using speaker labels to differentiate "who did speak and when".

The speaker diarization is essential for many speech-related applications with multi-speaker audio data, such as interactive multi-part speech recognition and speaker-dependent video indexing for business meetings or interviews.

The speaker diarization is generally regarded as a speaker clustering that assigns or classifies speaker diarization labels to each speech segment.

A clustering-based speaker diarization system generally has a modular structure consisting of speech activity detection, speaker embedding extractor, and speaker clustering. For a given utterance, each segment may be represented by a speaker embedding vector, such as an i-vector, a d-vector, and an x-vector. After assigning a speaker label to each segment, all segments having the same speaker label are grouped into a cluster. Although such a clustering-based speaker diarization system has been stably performed in many recent speaker diarization tasks, it has two disadvantages.

First, since the speaker embedding for each segment can be expressed by only one speaker, it is difficult to process speech segments in which two or more speakers overlap.

Second, the clustering-based speaker diarization system is limited in performance because all modules are not optimized in common.

In order to overcome such disadvantages, an end-to-end neural diarization (EEND) method has been proposed.

Unlike the conventional clustering-based method, the end-to-end neural diarization (EEND) method considers speaker diarization as a multi-label classification. For speaker labeling, the end-to-end neural diarization (EEND) method does not need a speech activity detection and overlapped speech detection module in an end-to-end speaker diarization framework.

In addition, in a case in which a self-attention mechanism is applied to the end-to-end neural diarization (EEND) method, performance is improved since self-Attention can simultaneously accommodate global relationship information in all frames.

However, such a self-attention-EEND (SA-EEND) method has a disadvantage in that speaker diarization performance is deteriorated when four or more encoder blocks are added.

PATENT LITERATURE

Patent Documents

Patent Document 1: Korean Patent No. 10-2190989 entitled "Method for generating speech in simultaneous speech section" (published on Dec. 15, 2020)

SUMMARY OF THE INVENTION

Accordingly, the present invention has been made to solve the above-mentioned problems occurring in the prior arts, and it is an object of the present invention to provide end-to-end speaker diarization system and method using an auxiliary loss to separate a plurality of speakers without performance degradation even if an encoding block is added through converter (transformer) learning having an auxiliary loss-based residual connection.

To accomplish the above object, according to an aspect of the present invention, there is provided an end-to-end speaker diarization system using an auxiliary loss.

The end-to-end speaker diarization system using an auxiliary loss according to an embodiment of the present invention includes: an input unit for receiving audio data from a plurality of speakers; a speaker diarization unit for separating the speakers by using a residual connection and an auxiliary loss based on deep learning; and an output unit for providing the audio data by dividing the audio data for each speaker and differentiating the audio data for time interval.

According to an aspect of the present invention, there is provided an end-to-end speaker diarization method using an auxiliary loss, and a computer program for executing the method.

The end-to-end speaker diarization method using an auxiliary loss according to an embodiment of the present invention includes the steps of: end-to-end speaker diarization method using an auxiliary loss, the method comprising the steps of: receiving audio data from a plurality of speakers; separating the speakers by using a residual connection and an auxiliary loss based on deep learning; and providing the audio data by dividing the audio data for each speaker and differentiating the audio data for time interval.

According to an embodiment of the present invention, the end-to-end speaker diarization system and method using an auxiliary loss can differentiate and separate speakers through speaker labeling based on the transformer learning using an auxiliary loss even if speaker speeches overlap in a multi-speaker environment.

In addition, According to an embodiment of the present invention, the end-to-end speaker diarization system and method using an auxiliary loss can increase accuracy by increasing the number of encoding blocks by using the residual connection without performance degradation.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The present invention may have various changes and various embodiments, and specific embodiments will be illustrated in the drawings and will be described in detail through the detailed description. It should be understood, however, that there is no intent to limit example embodiments of the invention to the particular forms disclosed, but on the contrary, example embodiments of the invention are to cover all modifications, equivalents, and alternatives falling within the technical idea and scope of the present invention. It should be understood that, in the terms used in the present specification and claims, a singular expression includes a plural expression unless otherwise described.

Hereinafter, preferred embodiments of the invention will be described in detail with reference to the accompanying drawings. In describing the invention with reference to the accompanying drawings, like elements are referenced by like reference numerals or signs regardless of the drawing numbers and description thereof is not repeated.

Figure 1:
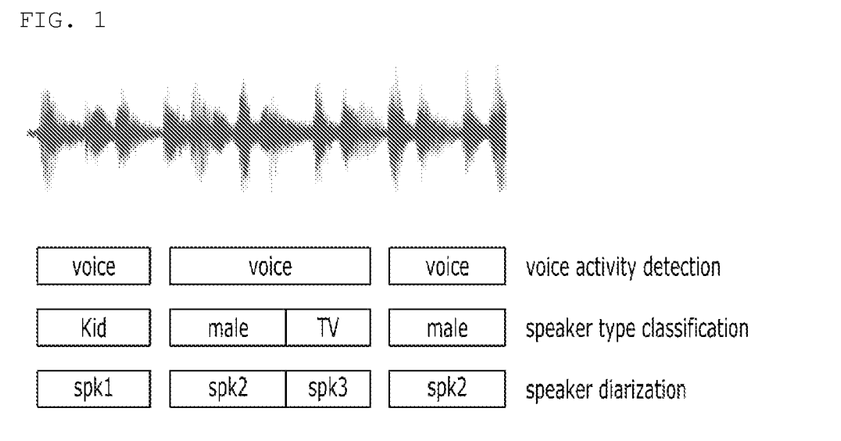
FIG. 1 is a schematic diagram for describing the concept of speak diarization.

FIG. 1 is a schematic diagram for describing the concept of speak diarization.

Referring to FIG. 1, the conventional speaker diarization method includes: detecting speech activity, classifying speakers using a speaker embedding extractor, and separating the speakers through speaker clustering. The clustering-based speaker diarization model has difficulty in speaker diarization when speech segments overlap in a case in which there are multiple speakers.

Figure 2:
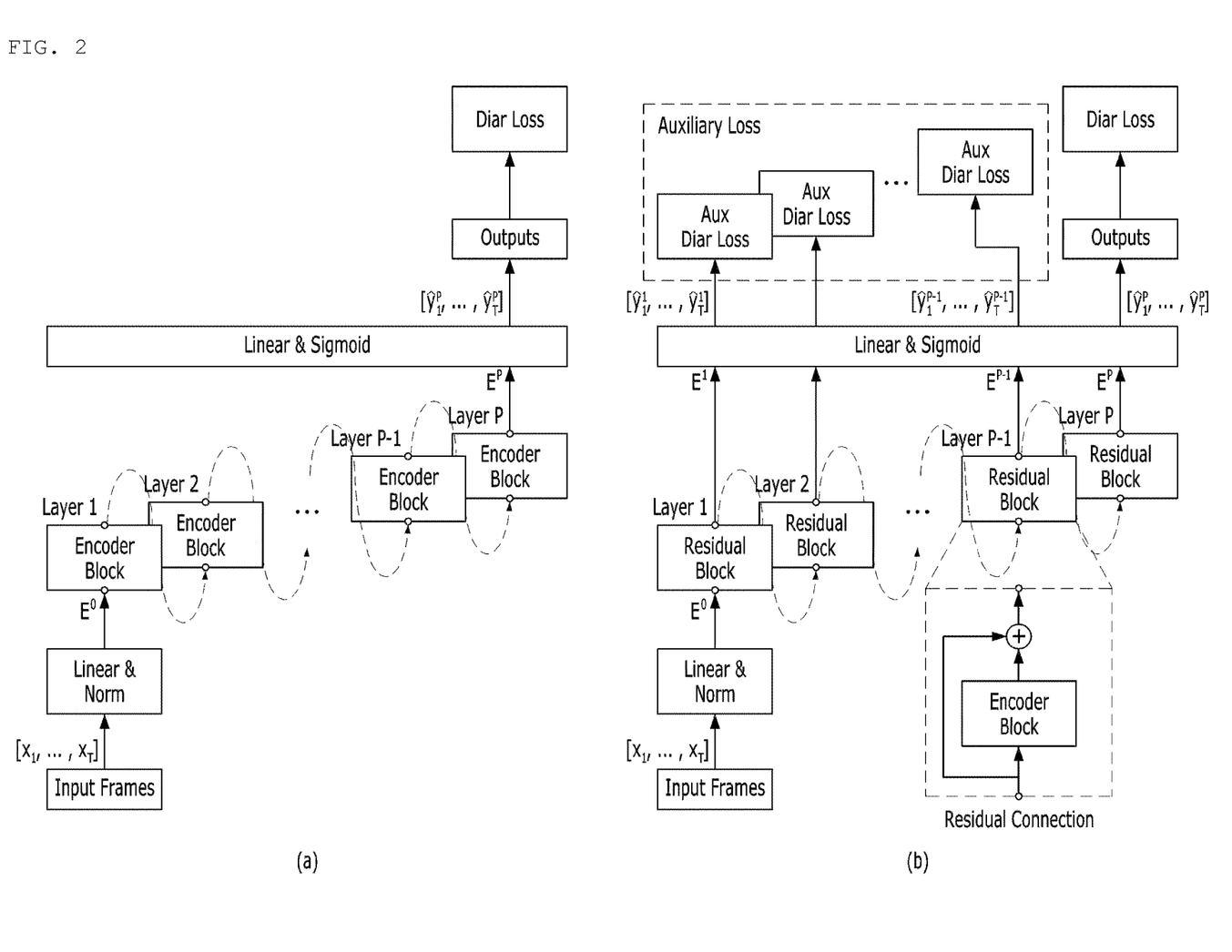
FIGS. 2 to 4 are views illustrating an end-to-end speaker diarization system using an auxiliary loss according to an embodiment of the present invention.
Figure 3:
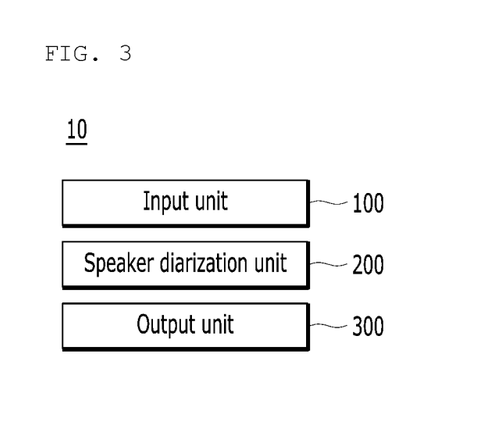
Figure 4:
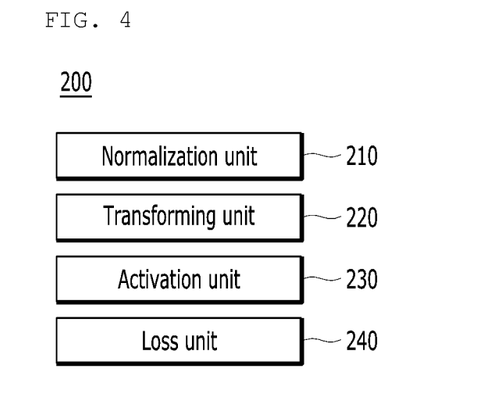

FIGS. 2 to 4 are views illustrating an end-to-end speaker diarization system using an auxiliary loss according to an embodiment of the present invention.

FIG. 2 is to show differences between the self-attention end-to-end neural diarization (SA-EEND) and the end-to-end speaker diarization (RX-EEND) system using an auxiliary loss of a transformer having a residual connection utilized in the end-to-end speaker diarization system using an auxiliary loss according to the embodiment of the present invention.

FIG. 2(a) illustrates the conventional self-attention end-to-end neural diarization (SA-EEND) model, and FIG. 2(b) illustrates the end-to-end speaker diarization (RX-EEND) system using an auxiliary loss of a transformer having a residual connection according to the embodiment of the present invention.

Referring to FIG. 2(a), the self-attention end-to-end neural diarization (SA-EEND) method, first, linearizes and normalizes an input frame as expressed in the following [Equation 1], and then, calculates an embedding vector of the input frame.

$$e_t^0 = \text{Norm}(\text{Linear}^F(x_t)) \in \mathbb{R}^D \quad \text{[Equation 1]}$$

The self-attention end-to-end neural diarization (SA-EEND) model provides a self-attention function in the $(p-1)^{th}$ embedding as shown in [Equation 2]. The self-attention end-to-end neural diarization (SA-EEND) model is modified by directly propagating an inclination from the $p^{th}$ encoder block to the $(p-1)^{th}$ encoder block and adding a residual connection to increase convergence speed.

$$E^p = \text{Encoder}_p^D(E^{p-1}), (1 \leq p \leq P). \quad \text{[Equation 2]}$$

The self-attention end-to-end neural diarization (SA-EEND) model can calculate an output value ($\hat{y}_t = [\theta_{t,1}, \ldots, \theta_{t,s}]$) at time t as shown in [Equation 3] by applying the last embedding vector $E^p$ to the linear & sigmoid functions after passing through all p encoder blocks.

$$\hat{y}_t = \text{sigmoid}(\text{Linear}^D(e_t^P)). \quad \text{[Equation 3]}$$

The self-attention end-to-end neural diarization (SA-EEND) model applies the linear and sigmoid functions only to the embedding vector of the last encoder block.

In the self-attention end-to-end neural diarization (SA-EEND) model, a single loss function such as [Equation 4] is sequentially back-propagated to the plurality of encoder blocks.

$$\mathcal{L}_d = \frac{1}{TS} \min_{\phi \in perm(S)} \sum_{t=1}^{T} H(y_t^\phi, \hat{y}_t) \quad \text{[Equation 4]}$$

In the self-attention end-to-end neural diarization (SA-EEND) model, the last encoder block contributes the most, but the performance is deteriorated when four or more encoder blocks are added.

Referring to FIG. 2(b), the end-to-end speaker diarization system 10 using an auxiliary loss may utilize the end-to-end speaker diarization using an auxiliary loss (RX-EEND) model of a transformer having a residual connection.

The end-to-end speaker diarization system 10 using an auxiliary loss adds a residual connection to the encoder blocks, and applies different auxiliary losses to the encoder blocks so as to overcome the problem of performance deterioration when the number of encoder blocks increases, and to enhance accuracy.

The end-to-end speaker diarization system 10 using an auxiliary loss may refer to an encoder block having the residual connection as a residual block.

In addition, the end-to-end speaker diarization system 10 using an auxiliary loss may apply different auxiliary losses to the encoder blocks.

The end-to-end speaker diarization system 10 using an auxiliary loss may apply the linear and sigmoid functions to output values of the encoder blocks.

Therefore, the end-to-end speaker diarization system 10 using an auxiliary loss is an end-to-end speaker diarization (RX-EEND) model using an auxiliary loss of a transformer having a residual connection.

Referring to FIG. 3, the end-to-end speaker diarization system 10 includes an input unit 100, a speaker diarization unit 200, and an output unit 300.

The input unit 100 receives audio data having a plurality of speakers. The input unit 100 may provide the audio data to the speaker diarization unit 200 in the form of a spectrogram.

The speaker diarization unit 200 may separate a plurality of speakers from the received spectrogram type audio data.

The speaker diarization unit 200 may separate speakers based on deep learning. For example, the speaker diarization unit 200 may separate a plurality of speakers for time interval by driving the end-to-end speaker diarization (RX-EEND) model using an auxiliary loss of a transformer having a residual connection.

Referring to FIG. 3, the speaker diarization unit 200 includes a normalization unit 210, a transforming unit 220, an activation unit 230, and a loss unit 240.

The normalization unit 210 performs the linear and normalization operation with respect to a spectrogram type input frame. The normalization unit 210 linearizes and normalizes the input frame using [Equation 2], and calculates an input embedding vector (E) in the residual block.

The transforming unit 220 may use a transformer model.

The transforming unit 220 refers to an encoding block having a residual connection as a residual block.

The transforming unit 220 may calculate an embedding vector by applying [Equation 5] to the $p^{th}$ residual block.

$$e_t^p = e_t^{p-1} + \text{Encoder}_p^D(e_1^{p-1}, \ldots, e_T^{p-1})(1 \leq p \leq P) \quad \text{[Equation 5]}$$

The activation unit 230 may apply the linear and sigmoid functions to the embedding vector of the residual block. The activation unit 230 may calculate the $P^{th}$ encoded embedding vector using [Equation 6].

$$\hat{y}_t^p = \text{sigmoid}(\text{Linear}^D(e_t^p))(1 \leq p \leq P-1). \quad \text{[Equation 6]}$$

The activation unit 230 may apply the linear and sigmoid functions to the embedding vectors of the encoder blocks. However, the conventional self-attention end-to-end speaker diarization (SA-EEND) model applies the linear and sigmoid functions only to the output of the last encoder block.

The loss unit 240 may define the loss function as in [Equation 7].

$$\mathcal{L} = \mathcal{L}_d + \lambda \mathcal{L}_{aux} \quad \text{[Equation 7]}$$

The loss unit 240 calculates a diarization loss in the same as $L_d$ of [Equation 4], and calculates and adds an auxiliary loss $L_{aux}$. In this instance, the loss unit 240 may use $\lambda$ as a hyperparameter that controls the degree of efficiency of auxiliary loss relative to the total loss.

The loss unit 240 may define the auxiliary loss $L_{aux}$ in two ways according to the speaker permutation application method.

The first method of the loss part 240 to calculate the auxiliary loss $L_{aux}$ can be defined as in [Equation 8].

$$\mathcal{L}_{aux}^{shard} = \frac{1}{TS(P-1)} \sum_{p=1}^{P-1} \sum_{T=1}^{T} H\left(y_t^{\phi p}, \hat{y}_t^p\right) \quad \text{[Equation 8]}$$

Here, $\Phi P$ is the same permutation as $L_d$ in [Equation 4], and is shared in all sub-encoder blocks. In other words, the loss unit 240 may share and use the label permutation with respect to the output of the last layer with all other layers.

The second method of the loss part 240 to calculate the auxiliary loss $L_{aux}$ individually optimizes $\Phi P$ with respect to the encoder blocks as shown in [Equation 9].

$$\mathcal{L}_{aux}^{indiv} = \frac{1}{TS(P-1)} \sum_{p=1}^{P-1} \min_{\phi_p \in perm(S)} \sum_{t=1}^{T} H\left(y_t^{\phi p}, \hat{y}_t^p\right) \quad \text{[Equation 9]}$$

The loss unit 240 may apply different auxiliary losses to the encoder blocks.

The loss unit 240 may define an auxiliary loss by [Equation 9], and calculate an embedding vector in which the speaker is separated.

The loss unit 240 may calculate a permutation invariant training (PIT) loss for each layer of each encoding vector. In this instance, the loss unit 240 may use other permutation.

Referring to FIG. 3, the output unit 300 may provide audio data by differentiating speech by each speaker and by dividing the audio data for time interval.

Figure 5:
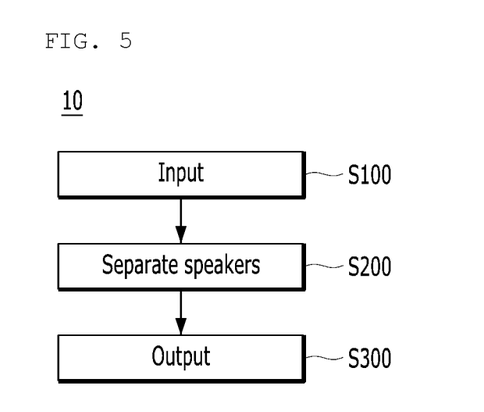
FIGS. 5 and 6 are views illustrating an end-to-end speaker diarization method according to an embodiment of the present invention.
Figure 6:
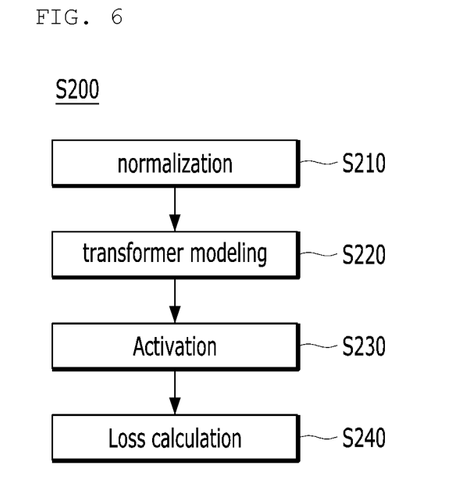

FIGS. 5 and 6 are views illustrating an end-to-end speaker diarization method according to an embodiment of the present invention. The process to be described below is a process performed by each functional unit of the end-to-end speaker diarization system using an auxiliary loss in each step, but for concise and clear description of the present invention, the subject of each step is commonly called an end-to-end speaker diarization system using an auxiliary loss.

Referring to FIG. 5, in step S100, the end-to-end speaker diarization system 10 using an auxiliary loss receives audio data having a plurality of speakers.

In step S200, the end-to-end speaker diarization system 10 using the auxiliary loss may separate the speakers for time interval by labeling for the plurality of speakers.

In step S300, the end-to-end speaker diarization system 10 using an auxiliary loss may provide audio data by dividing audio data for each speaker and differentiating the audio data for time interval.

FIG. 6 is a flow chart illustrating a deep learning model for speaker diarization performed by the end-to-end speaker diarization system 10 using the auxiliary loss in step S200 of FIG. 5.

Referring to FIG. 6, in step S210, the end-to-end speaker diarization system 10 using the auxiliary loss performs linearization and normalization with respect to the input frame. the end-to-end speaker diarization system 10 using the auxiliary loss performs linearization and normalization with respect to the spectrogram type input frame. The end-to-end speaker diarization system 10 using the auxiliary loss linearizes and normalizes the input frame using [Equation 2] described above, and calculates the input embedding vector (E) in the residual block.

In step S220, the end-to-end speaker diarization system 10 using an auxiliary loss performs transformation using a transformer model. The end-to-end speaker diarization system 10 using an auxiliary loss may refer to an encoding block having a residual connection as a residual block.

In step S230, the end-to-end speaker diarization system 10 using an auxiliary loss applies the linear and sigmoid functions to the embedding vector of each encoder block. The end-to-end speaker diarization system 10 using an auxiliary loss may apply the linear and sigmoid functions to the embedding vector of each residual block.

In step S240, the end-to-end speaker diarization system 10 using the auxiliary loss calculates each individual auxiliary loss. The end-to-end speaker diarization system 10 using an auxiliary loss calculates a diarization loss, and calculates and adds an auxiliary loss add $L_{aux}$. The end-to-end speaker diarization system 10 using an auxiliary loss may apply different auxiliary losses to each encoder block.

FIGS. 7 to 11 are views illustrating examples of performance result data of the end-to-end speaker diarization system using an auxiliary loss according to an embodiment of the present invention.

Figure 7:
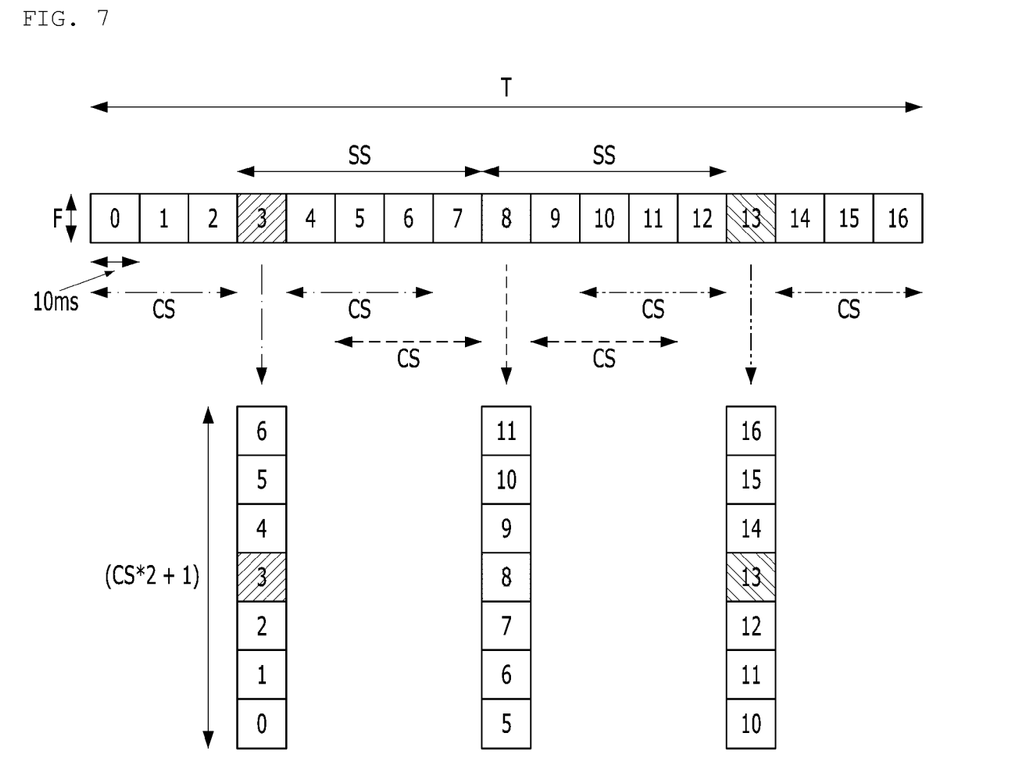
FIGS. 7 to 11 are views illustrating examples of performance result data of the end-to-end speaker diarization system using an auxiliary loss according to an embodiment of the present invention.

FIG. 7 is an example of a spectrogram of the audio data used by the end-to-end speaker diarization system using an auxiliary loss according to an embodiment of the present invention.

Referring to FIG. 7, the input unit 100 extracts a 5000×23 log mel spectrogram speech feature having a 23rd dimension of 50 seconds, and constructs an input value through a context size and subsampling. For example, the input unit 100 collects left and right frames by a context size of 3 to make seven frames into one frame, and configures the final input feature by skipping by a subsampling size of 5. In this case, the input unit 100 actually has an input size of (5000/10)×{23*(7×2+1)}=500×345 by using a context size of 7 and a subsampling size of 10.

Figure 8:
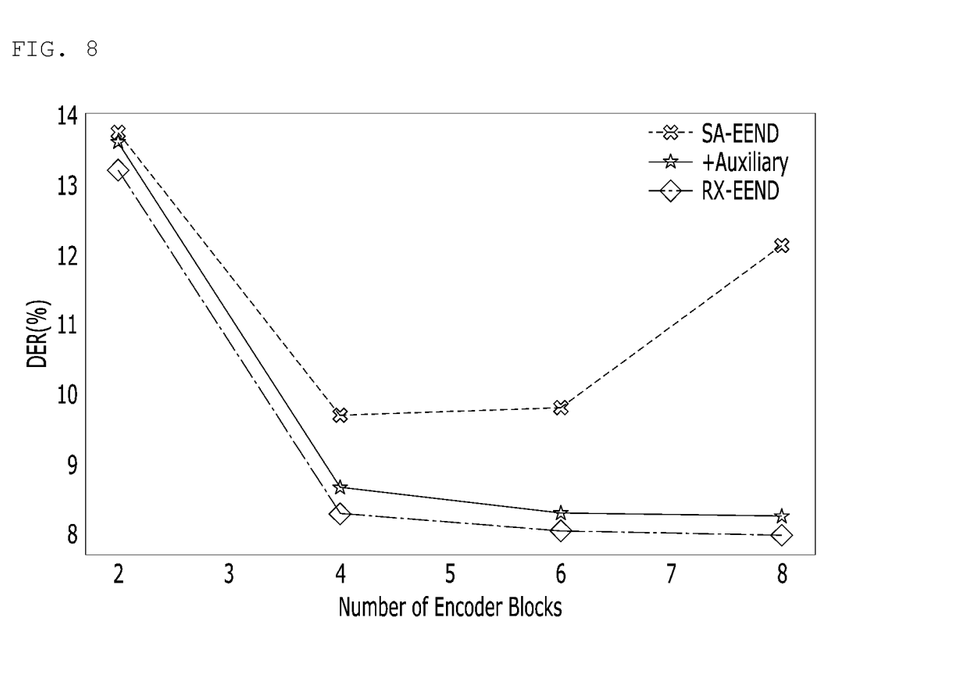

FIG. 8 is a graph showing diarization error performance according to the number of encoder blocks in an end-to-end speaker diarization environment.

Referring to FIG. 8, the SA-EEND model exhibits performance degradation according to the number of layers. For example, in the SA-EEND model, it can be seen that the diarization error (DER) increases in a case in which the number of the encoder blocks is 4 or more.

The end-to-end speaker diarization system 10 using an auxiliary loss according to an embodiment of the present invention does not deteriorate performance even if the number of encoders increases since being based on the end-to-end speaker diarization model through transformer learning having the auxiliary loss-based residual connection.

Figure 9:
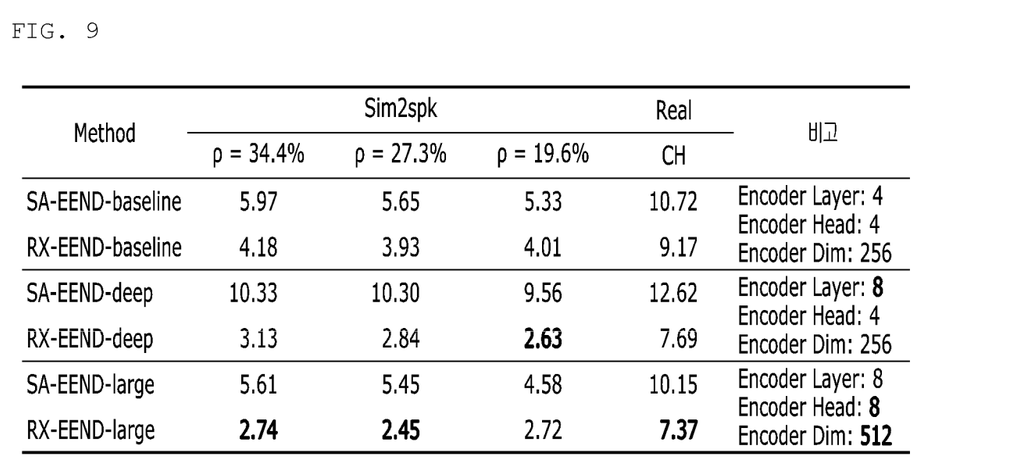

FIG. 9 shows a screen for comparing the performance of the end-to-end speaker diarization system using an auxiliary loss according to an embodiment of the present invention with the self-attention end-to-end speaker diarization (SA-EEND) model.

FIG. 9 illustrates a baseline. The end-to-end speaker diarization system 10 using an auxiliary loss was lower in diarization error (DER) for the actual dataset (CH) than the SA-EEND model. Accordingly, it can be determined that the residual connection contributes to reducing the generalization error.

Even in a deep example tested by increasing the number of the encoder blocks to eight, the end-to-end speaker diarization system 10 using an auxiliary loss was better in performance than the SA-EEND model.

Finally, even in a large example tested by using eight encoder blocks, eight heads, and 512 dimensions, it was confirmed that the diarization error (DER) for the actual dataset with an overlap ratio of 34.4% and 27.3% and Sim2spk was reduced.

Figure 10:
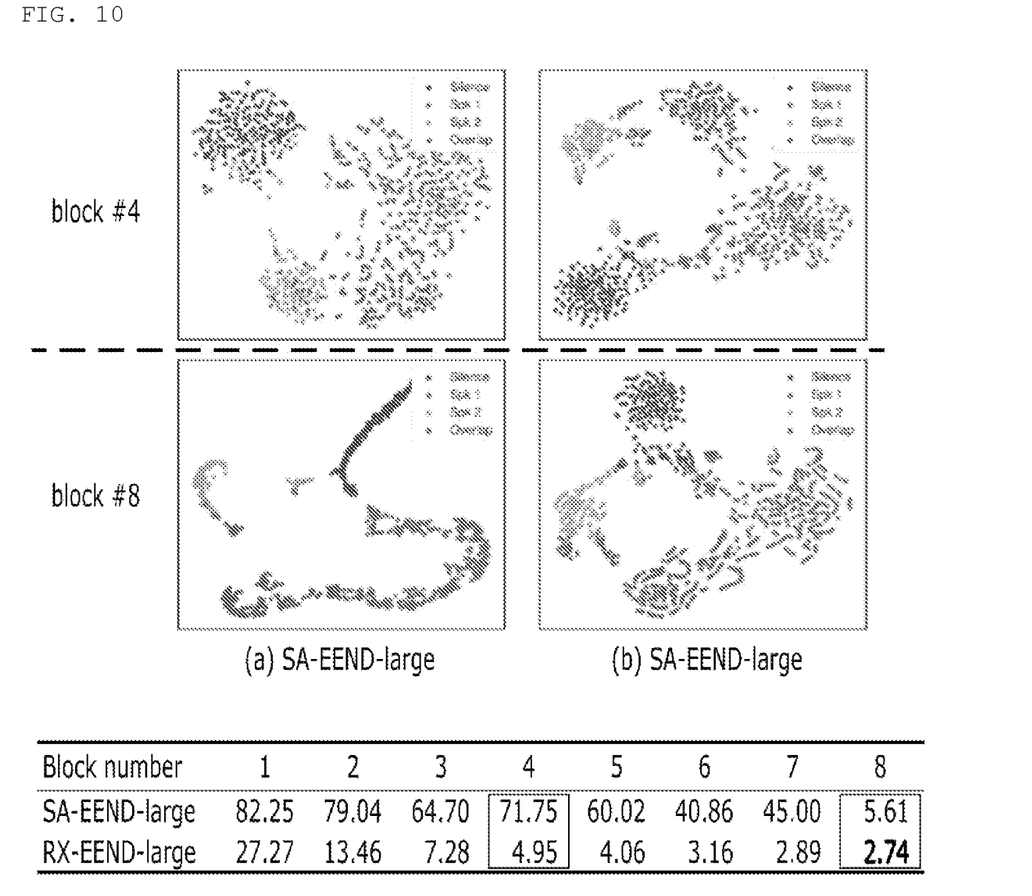
Figure 11:
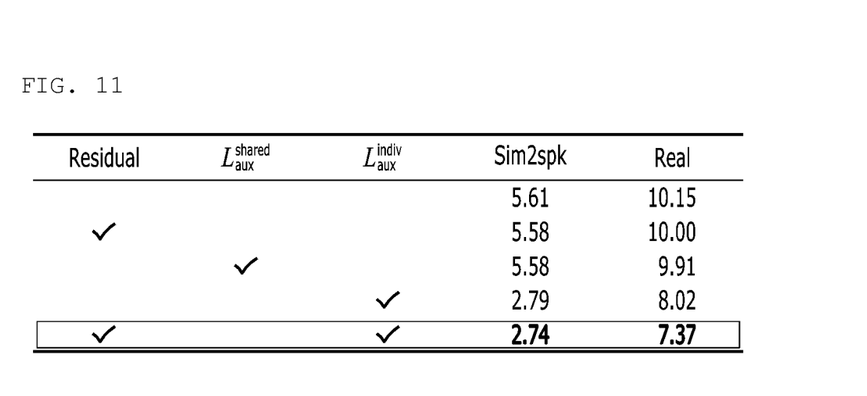

FIGS. 10 and 11 are examples of experimental results for confirming performance of the end-to-end speaker diarization system using an auxiliary loss according to an embodiment of the present invention.

FIG. 10 shows a T-SNE plot screen representing encoder blocks #4 and #8 with respect to the end-to-end speaker diarization systems 10 using auxiliary losses based on an SA-EEND_large and an RX-EEND_large of a transformer having residual connection.

The SA-EEND_large and the RX-EEND_large are clearly differentiated with respect to silence, speakers (Sp1 and Sp2), and overlap in the T-SNE plot of the encoder block #8. However, in the encoder block #4, the RX-EEND_large separated well, but the SA-EEND_large did not separate silence and speakers well.

Comparing the diarization error (DER) for blocks of the SA-EEND_large and the RX-EEND_large, the diarization error (DER) was decreased in both of the two models as the number of the blocks increased.

However, except the last block, the diarization error (DER) was very high in all sub-blocks for the SA-EEND_large. Accordingly, it was seen that performance of the SA-EEND depended on the last block.

FIG. 11 is an example of testing the performance of two types of auxiliary loss of the end-to-end speaker diarization system using an auxiliary loss according to an embodiment of the present invention.

FIG. 11 shows examples of the experimental results in a case of adding residual connection (Residual), in a case of sharing an auxiliary loss ($\mathcal{L}_{aux}^{shared}$), and in a case of using individual auxiliary loss ($\mathcal{L}_{aux}^{indiv}$).

As illustrated in FIG. 11, in the case of adding residual connection, and in the case of using individual auxiliary loss, the diarization error is the lowest.

That is, the end-to-end speaker diarization system 10 using an auxiliary loss has improved speaker diarization performance using the residual connection and the auxiliary loss.

The end-to-end speaker diarization method using an auxiliary loss may be implemented by computer-readable codes on a computer-readable medium. The computer-readable recording medium may be, for example, a mobile recording medium, such as a CD, a DVD, a blue Ray disc, an USB storage device, a mobile hard disc, and the like, or a fixed recording medium, such as a ROM, a RAM, a computer-embedded hard disk, or the like. A computer program recorded in the computer-readable recording medium may be transferred to another computing device through a network, such as Internet and mounted in another computing device. Accordingly, the computer program may be used in another computing device.

As described above, even though all the components constituting the embodiments of the present invention are described as being combined into one or operating in combination, the present invention is not necessarily limited to such embodiments. That is, within the scope of the present invention, all the components may operate by selectively combining one or more.

While the operations in the drawings are illustrated in a particular order, it should not be understood that the operations must be executed in the particular order or in the sequential order, or that all of the operations should be executed to obtain the desired result. In certain situations, multitasking and parallel processing may be advantageous. Moreover, the separation of various configurations in the embodiments described above should not be understood as necessarily requiring such separation, and it should be understood that the described program components and systems can generally be integrated together into a single software product or packaged into multiple software products.

So far I looked at the center of the preferred embodiment for the present invention. Those skilled in the art will appreciate that the present invention can be implemented in a modified form without departing from the essential features of the present invention. Therefore, the disclosed embodiments should be considered in descriptive sense only and not for purposes of limitation. The scope of the present invention is shown in the claims rather than the foregoing description, and all differences within the scope will be construed as being included in the present invention.

What is claimed is:

1. An end-to-end speaker diarization system using an auxiliary loss, comprising:
   an input unit receiving audio data from multiple speakers;
   a speaker diarization unit that separates the speakers by utilizing a residual connection and an auxiliary loss based on deep learning;
   an output unit providing the audio data, dividing the audio data for each speaker and differentiating the divided audio data according to time intervals, wherein said speaker diarization unit comprises:
- a normalization unit that performs linearization and normalization with respect to an input frame;
- a transforming unit utilizing a transformer model;
- an activation unit that applies linear and sigmoid functions to the embedding vector of each encoder block; and
- a loss unit calculating an auxiliary loss, wherein said transforming references an encoding block with the residual connection as a residual block, applying $$e_t^p = e_t^{p-1} + \text{Encoder}_p^D(e^{p-1}, \ldots, e_t^{p-1}), (1 \leq p \leq P) \quad \text{[Equation 5]}$$

to the p-th residual block to produce the embedding vector,
and said activation unit uses $$\hat{y}_t^p = \text{sigmoid}(\text{Linear}^D(e_t^p))(1 \leq p \leq P) \quad \text{[Equation 6]}$$

while said loss unit utilizes $$\mathcal{L}_{aux}^{indiv} = \frac{1}{TS(P-1)} \sum_{p=1}^{P-1} \min_{\phi_p \in perm(S)} \sum_{t=1}^{T} H(y_t^{\phi_p}, \hat{y}_t^p) \quad \text{[Equation 9]}$$

to optimize ΦP individually for each encoder block, applying different auxiliary losses to each encoder block, resulting in producing PIT (Permutation Invariant Training) loss for each encoding vector's layer using auxiliary loss in the end-to-end speaker diarization system.

2. An end-to-end speaker diarization method using an auxiliary loss, comprising the steps of:
- receiving audio data from multiple speakers;
- separating the speakers using a residual connection and an auxiliary loss based on deep learning;
- providing the audio data by dividing the audio data for each speaker and differentiating according to time intervals;

wherein the step of separating the speakers using a residual connection and an auxiliary loss includes:
- performing linearization and normalization on the input frame;
- transforming using a transformer model;
- applying linear and sigmoid functions to the embedding vector of each encoder block; and
- computing the auxiliary loss, wherein the step of transforming using a transformer model references an encoding block with a residual connection as a residual block, applying $$e_t^p = e_t^{p-1} + \text{Encoder}_p^D(e^{p-1}, \ldots, e_t^{p-1}), (1 \leq p \leq P) \quad \text{[Equation 5]}$$

to the p-th residual block to produce the embedding vector,
and the step of applying linear and sigmoid functions to the embedding vector uses $$\hat{y}_t^p = \text{sigmoid}(\text{Linear}^D(e_t^p))(1 \leq p \leq P) \quad \text{[Equation 6]}$$

with the auxiliary loss computed by optimizing each individual ΦP for each encoder block using $$\mathcal{L}_{aux}^{indiv} = \frac{1}{TS(P-1)} \sum_{p=1}^{P-1} \min_{\phi_p \in perm(S)} \sum_{t=1}^{T} H(y_t^{\phi_p}, \hat{y}_t^p) \quad \text{[Equation 9]}$$

to apply different auxiliary losses to each encoder block, resulting in PIT loss for each encoding vector's layer using auxiliary loss.

* * * * *